3,433,762
STABILIZED POLYPROPYLENE COMPOSITIONS CONTAINING A PHENOLIC ANTIOXIDANT AND TERT-ALKYL ESTER OF THIODISUCCINIC ACID
Charles Kezerian and Edwin G. Wallace, Orinda, Calif., and Adam F. Kopacki, Westwood, N.J., assignors to Stauffer Chemical Company, New York, N.Y., a corporation of Delaware
No Drawing. Continuation-in-part of application Ser. No. 634,440, Apr. 26, 1967, which is a continuation-in-part of application Ser. No. 347,358, Feb. 26, 1964. This application Dec. 22, 1967, Ser. No. 692,639.
U.S. Cl. 260—45.8   10 Claims
Int. Cl. C08f 45/58, 29/02

ABSTRACT OF THE DISCLOSURE

An antioxidant composition for polypropylene containing (1) from about 0.001% to 5.0% by weight of said polypropylene the phenolic compound (a) 4,4'-dithiobis (2,6-methylbenzylphenol), (b) 4,4'-dithiobis(ortho-phenylphenol), (c) 4,4'-butylidene bis(6-tert-butyl-m-cresol), (d) 4,4'-thiobis(3-methyl-6-tert-butylphenol), (e) the 3:1 condensation product of 3-methyl-6-tert-butylphenol with crotonaldehyde or (f) 6-(4-hydroxy-3,5-di-tert-butylanilino)-2,4-bis(n-octylthio-1,3,5-triazine and (2) from about 0.001% to about 5% by weight of said polypropylene of a tetra-alkyl ester of thiodisuccinic acid of the formula

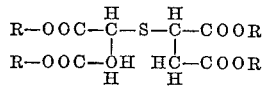

wherein R is selected from the group consisting of alkyl and phenyalkyl groups containing from 4 to 22 carbon atoms, inclusive. An example of said ester is tetra-n-decyl thiodisuccinate.

---

This application is a continuation-in-part application of application Ser. No. 634,440, filed Apr. 26, 1967, now abandoned, which is a continuation-in-part of application Ser. No. 347,358, filed Feb. 26, 1964, now abandoned.

This invention relates to the improved stabilization of polymeric materials containing phenolic antioxidants against oxidation by the inclusion therein of small but effective amounts of certain esters of thiodisuccinic acid. This invention also relates to compositions of matter comprising plastic resins and a phenolic or hindered phenolic antioxidant which contains one or more of certain esters of thiodisuccinic acid functioning therein as an antioxidant.

The mechanism of oxidative deterioration toward which the stabilizer compositions of this invention are directed is known as "thermal oxidation." This type of oxidative deterioration may take place in the absence of ultraviolet light and, as the name implies, is accelerated by an increased in temperature.

Polymeric compositions which are benefited by the inclusion of additives, which function as antioxidants, include all of the essentially saturated hydrocarbon polymeric materials, polymers containing unsaturated linkages, vinylic resins, such as polyvinyl chloride, and polyethers, especially of the type polyoxymethylene. The essentially saturated hydrocarbon polymers include, especially, polymers containing tertiary hydrogen atoms such as polyethylene wherein random tertiary hydrogen atoms result from branching, and particularly polypropylene containing ordered tertiary hydrogen atoms. Polymers that can also be included are almost completely linear polymers such as low pressure polyethylene and materials containing only secondary hydrogen atoms such as polyisobutylene. Polymers containing olefinic double bonds also are extremely susceptible to oxidation. Examples of such unsaturated polymers include polybutadiene, polyisoprene, and the high impact plastics such as high impact styrene and high impact polyvinyl chloride. The mechanism involved in the oxidation of unsaturated polymers essentially requires peroxides and peroxide radical formation which subsequently lead to chain splitting with the formation of aldehydes and acids. Polyvinyl chloride and chlorine-containing polymers in general degrade by a dehydrohalogenation which produces unsaturation in the polymer. This process is usually accompanied by oxidation at the point of unsaturation, therefore the inclusion of an antioxidant in the formulation of such compositions is extremely useful. Polyethers such as polyoxymethylene and the like are suspectible to oxidation at elevated temperatures. Other materials protected by antioxidants include copolymers as well as homopolymers and mixtures of polymers, copolymers or both. Among the copolymers of value are the ordered, block, graft and random copolymers.

The effect of oxidative deterioration on polymeric materials can lead to changes in physical properties such as color, weight, hardness, tensile strength, continuity, shape internal stresses, and odor. The process of degradation is undoubtedly begun by the degradation of the polymer itself, although the total length of this procedure is unknown. In general, oxidative breakdown is a two-step process: (1) a primary oxidation of a susceptible link in the polymer chain, such as at a tertiary hydrogen atom or unsaturated linkage, if one is present in the polymer chain, and (2) a secondary procedure in which the links so oxidized attack another portion of the chain so as to result in a rapid autocatalytic breakdown of the polymer. Therefore, it is believed the function of any added material is to combine somehow with the oxidation product of the primary step so as to deactivate it and prevent further attack to the polymer chain, thus stopping the autocatalytic breakdown. The antioxidant is not expected to interfere with the primary oxidation step, although this action is not particularly undesirable.

As might be expected, the seriousness of this problem has resulted in the development and exploitation of a considerable assortment of stabliized polymeric compositions. Among this assortment of thermal antioxidants are the secondary amines of resonant structures, phenols and hindered phenols, and thiodipropionates. As antioxidants the phenolic class holds the greater interest. The term antioxidant stabliizer will be used hereinafter to mean stabilizers of the following phenolic class; alkylated phenols, alkylated diphenols, thio bis(alkylated phenols). These compounds are well known to those skilled in the art to which the present invention pertains. To improve the properties of phenolic antioxidant stabilizers various derivatives have been prepared and used either alone or in combination with thiodipropionic acid esters. Stabilizers containing metals and metal salts have been suggested. The use of activated carbon black is also mentioned in prior art. The requirement for improved stabilizers and polymer compositions is ever continuing with the growing application of plastics.

In accordance with the present invention, it has been discovered that the combination of phenolic antioxidants and the esters of thiodisuccinic acid constitute a preferred antioxidant stabilizer for the control of thermal oxidative degradation in oxidative susceptible polymer compositions as hereinabove described, and that in said combination the compounds are mutually activating to accomplish an improved result.

More specifically, this invention relates to the use of combinations of phenolic and hindered phenolic polymer antioxidants and of esters of thiodisuccinic acid of the general formula

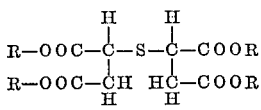

wherein R is selected from the group consisting of alkyl and phenalkyl groups containing from 4 to approxiamtely 22 carbon atoms, inclusive, for the improved stabilization of oxidative deterioration to polymeric materials in which they are incorporated.

The esters of thiodisuccinic acid that were tested in combination with various commercial phenolic antioxidants included: tetra-n-butyl thiodisuccinate, tetra-n-octyl thiodisuccinate, tetra-iso-decyl thiodisuccinate, tetra-n-dodecyl thiodisuccinate, tetra-iso-octyl thiodisuccinate, tetra-n-decyl thiodisuccinate and tetra-benzyl thiodisuccinate. The above mentioned compounds were used in combination with various phenolic antioxidants. Examples of said phenolic antioxidants include Topanol CA® [a 3:1 condensation product of 3-methyl-6-tert-butylphenol with crotonaldehyde], Irganox 565® [6-(4-hydroxy - 3,5 - di-tert - butylanilino) - 2,4-bis(n-octylthio)- 1,3,5-triazine], Santowhite Powder® [4,4'-butylidene-bis (6-tert-butyl-meta-cresol)], Santonox R® [4,4'-thio-bis (3-methyl-6-tert-butylphenol)], 4,4'-dithio-bis(orthophenylphenol) and 4,4'-dithio-bis(2,6-α-methylbenzylphenol). These phenolic compounds are termed antioxidants because in ordinary use their inhibitive active is directed to the control of oxidative deterioration in polymers.

The compounds of the present invention may be employed by mixing with the polymer in any suitable manner that will effect thorough distribution. This can be accomplished in a machine suitable for mixing solids or incorporating liquids. Instead of adding the combination to the polymer in the solid or molten state, it can be added to a solution or suspension of polymer in an organic solvent or to an aqueous dispersion thereof and the volatile solvent subsequently removed by vaporization. The amount of agents added can vary from 0.001% to 5.0% based on the weight of polymer, but it is preferred to use the minimum amount required to achieve the desired results.

The following example illustrates method of testing and the utility of this invention.

Test methods.—The test methods employed estimate the oxidative stability of an essentially saturated hydrocarbon polymeric material by exposure to long term oven aging at elevated temperatures below the melting point of the resin. Polypropylene was chosen as the test polymeric material since it contains ordered tertiary hydrogen atoms which make polypropylene extremely susceptible to thermal oxidation. Unstabilized polypropylene resins failed within approximately one hour in the test, while stabilized resins exhibited longer lives.

Circular specimens 1″ in diameter are cut from a compression molded sheet, prepared by pressing between polished press plates. Sample thickness was approximately 25 mils. The samples were placed in open Pyrex glass petri dishes and then placed in a heated oven. The heated oven was provided with a means of circulating air internally at a uniform velocity. The temperature of the air was held at 150° C. with a tolerance of ±1° C.

Duplicate samples were placed in the forced air circulating oven maintained at the specified temperature and the initial time was recorded. The samples were examined every hour initially and those withstanding the test for more than one day were then examined three times a day for signs of failure. Failure was determined visually and was defined as the start of resin degradation as shown by brown or yellow discoloration. There was also a loss of physical properties as shown by cracking and embrittlement. The failure time was determined and recorded. A set of control or reference resins stabilized and unstabilized were run in each month. In the following comparative examples the number of hours to embrittlement, i.e., failure of antioxidant, is reported.

EXAMPLE

This example demonstrates the improved antioxidative stability effect of combinations of selected phenolic antioxidants and certain esters of thiodisuccinic acid. The above mentioned test procedure was employed in this example. The table below lists the effects obtained by the inclusion of various amounts of antioxidant on the thermal oxidative stability of polypropylene. The various combinations are to be compared with the effect obtained by the individual known antioxidants.

The following is a list of commercially available phenolic antioxidants employed in this example. Numbers have been assigned to the materials and are used in the table to designate the phenolic antioxidant.

(1) 4,4'-dithio-bis(2,6-α-methylbenzylphenol).
(2) 4,4'-dithio-bis(ortho-phenylphenol).
(3) Topanol CA®: a 3:1 condensation product of 3-methyl-6-tert-butylphenol with crotonaldehyde.
(4) Irganox 565®: 6-(4-hydroxy-3,5-di-tert-butylanilino)-2,4-bis(n-octylthio) - 2,4 - bis(n-octylthio)-1,3,5-triazine.
(5) Santowhite Powder®: 4,4'-butylidene-bis(6-tert-butyl-m-cresol).
(6) Santonox R®: 4,4'-thio-bis(3-methyl-6-tert-butylphenol).

the following esters of thiodisuccinic acid have been prepared and tested:

|  | Designation |
| --- | --- |
| Tetra-isodecyl thiodisuccinate | A |
| Tetra-n-dodecyl thiodisuccinate | B |
| Tetra-n-octyl thiodisuccinate | C |
| Tetra-isooctyl thiodisuccinate | D |
| Tetra-n-decyl thiodisuccinate | E |
| Tetra-n-octadecyl thiodisuccinate | F |
| Tetra-benzyl thiodisuccinate | G |

TABLE

| Antioxidants | Percent | Time to failure at 150° C. (hrs.) |
| --- | --- | --- |
| (1) | 0.3 | 500 |
| (1) | 0.5 | 1,000 |
| (2) | 0.5 | 425–430 |
| (3) | 0.3 | 150 |
| (4) | 0.5 | 510 |
| (5) | 0.5 | 30 |
| (6) | 0.5 | 120 |
| A | 0.3 | 40 |
| B | 0.3 | 46 |
| C | 0.5 | 145 |
| D | 0.3 | 30 |
| E | 0.3 | 21 |
| F | 0.3 | 100 |
| G | 0.5 | 130 |
| (1)+C | 0.13+0.37 | 1,610–1,630 |
| (1)+E | 0.1+0.2 | 640–785 |
| (1)+G | 0.1+0.2 | 890 |
| (2)+C | 0.13+0.37 | 880–900 |
| (2)+F | 0.1+0.2 | 690 |
| (3)+A | 0.1+0.2 | 690–700 |
| (3)+B | 0.1+0.2 | 860–1,000 |
| (3)+C | 0.13+0.37 | 2,230–2,230 |
| (3)+D | 0.1+0.2 | 260 |
| (3)+E | 0.1+0.2 | 810–810 |
| (3)+F | 0.1+0.2 | 550 |
| (3)+G | 0.1+0.2 | 850 |
| (4)+B | 0.1+0.2 | 550–600 |
| (4)+C | 0.13+0.37 | 1,080–1,170 |
| (4)+C | 0.17+0.33 | 1,030–1,060 |
| (6)+C | 0.17+0.33 | 450–570 |

The above examples show that the compositions of the present invention, and especially the tetra-n-octyl thiodisuccinate and related esters, have been found to be outstanding in their ability to impart in the test polymer in which they are included, protection from degradation on exposure to thermal oxidative conditions.

Various changes and modifications may be made without departing from the spirit and scope of the invention

We claim:
1. A composition of matter comprising (1) polypropylene (2) from about 0.001% to 5.0% by weight of said polypropylene of a phenolic antioxidant selected from the group consisting of (a) 4,4'-dithio-bis(2,6-α-methylbenzylphenyl), (b) 4,4'-dithio-bis(ortho-phenylphenol), (c) 4,4' - butylidene - bis(6 - tert - butyl - m - cresol), (d) 4,4' - thio - bis(3 - methyl - 6 - tert - butylphenol), (e) the 3:1 condensation product of 3-methyl-6-tert-butylphenol with crotonaldehyde, and (f) 6-(4-hydroxy-3,5-di-tert-butyl-anilino)-2,4-bis (n - octylthio) - 1,3,5-triazine and (3) from about 0.001% to about 5% by weight of said polypropylene of a tetra-alkyl ester of thiodisuccinic acid of the formula

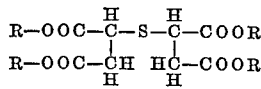

wherein R is selected from the group consisting of alkyl and phenalkyl groups containing from 4 to 22 carbon atoms, inclusive.

2. The composition of matter of claim 1 wherein said tetra-alkyl ester of thiodisuccinic acid is the compound tetra-n-octyl thiodisuccinate.

3. The composition of matter of claim 1 wherein said tetra-alkyl ester of thiodisuccinic acid is the compound tetra-n-decyl thiodisuccinate.

4. The composition of matter of claim 1 wherein said tetra-alkyl ester of thiodisuccinic acid is the compound tetra-n-dodecyl thiodisuccinate.

5. The composition of matter of claim 1 wherein said tetra-alkyl ester of thiodisuccinic acid is the compound tetra-benzyl thiodisuccinate.

6. The composition of matter of claim 1 wherein the phenolic antioxidant is the compound 4,4'-dithio-bis(2,6-methyl-benzylphenol).

7. The composition of matter of claim 1 wherein the phenolic antioxidant is the compound 4,4'-dithio-bis(orthophenylphenol).

8. The composition of matter of claim 1 wherein the phenolic antioxidant is the compound 4,4'-butylidene-bis (6-tert-butyl-m-cresol).

9. The composition of matter of claim 1 wherein the phenolic antioxidant is the 3:1 condensation product of 3-methyl-6-tert-butylphenol with crotonaldehyde.

10. The composition of matter of claim 1 wherein the phenolic antioxidant is the compound 6-(4-hydroxy-3,5-di-tert-butyl-anilino)-2,4-bis(n - octylthio) - 1,3,5 - triazine.

References Cited
UNITED STATES PATENTS

| | | |
|---|---|---|
| 2,603,616 | 7/1952 | Newton. |
| 2,831,897 | 8/1958 | Harris et al. |
| 3,196,185 | 7/1965 | Ranson. |
| 3,255,136 | 6/1966 | Hecker et al. |
| 3,245,992 | 4/1966 | Dexter et al. |

JAMES A. SEIDLECK, *Primary Examiner.*

U. P. HOKE, *Assistant Examiner.*

U.S. Cl. X.R.

260—45.85, 45.95